United States Patent
Nakase et al.

(10) Patent No.: US 9,957,581 B2
(45) Date of Patent: May 1, 2018

(54) METHOD FOR REFINING HOT METAL IN CONVERTER

(71) Applicant: JFE STEEL CORPORATION, Tokyo (JP)

(72) Inventors: Kenji Nakase, Fukuyama (JP); Yukio Takahashi, Fukuyama (JP); Naoki Kikuchi, Chiba (JP); Goro Okuyama, Chiba (JP); Shingo Sato, Kawasaki (JP); Yuichi Uchida, Fukuyama (JP); Yuji Miki, Fukuyama (JP)

(73) Assignee: JFE STEEL CORPORATION, Tokyo (JP)

( * ) Notice: Subject to any disclaimer, the term of this patent is extended or adjusted under 35 U.S.C. 154(b) by 481 days.

(21) Appl. No.: 14/382,720

(22) PCT Filed: Mar. 25, 2013

(86) PCT No.: PCT/JP2013/001997
§ 371 (c)(1),
(2) Date: Sep. 3, 2014

(87) PCT Pub. No.: WO2013/145686
PCT Pub. Date: Oct. 3, 2013

(65) Prior Publication Data
US 2015/0020648 A1    Jan. 22, 2015

(30) Foreign Application Priority Data

Mar. 29, 2012 (JP) .................................. 2012-075928
Oct. 31, 2012 (JP) .................................. 2012-239975

(51) Int. Cl.
*C21C 5/32* (2006.01)
*C21C 5/46* (2006.01)
(Continued)

(52) U.S. Cl.
CPC ................ *C21C 5/32* (2013.01); *C21C 1/025* (2013.01); *C21C 5/35* (2013.01); *C21C 5/4606* (2013.01);
(Continued)

(58) Field of Classification Search
CPC ....... C21C 1/025; C21C 2250/00; C21C 5/32; C21C 5/35; C21C 5/4606; C21C 5/4613;
(Continued)

(56) References Cited

U.S. PATENT DOCUMENTS 4,642,047 A * 2/1987 Gitman ................. B05B 7/0861
239/424
2011/0011209 A1 * 1/2011 Tateishi .................... C21C 5/35
75/375

FOREIGN PATENT DOCUMENTS

GB    2 065 711 A     7/1981
JP    A-9-20913       1/1997
(Continued)

OTHER PUBLICATIONS

Aug. 3, 2015 Extended Search Report issued in European Patent Application No. 13767440.4.
(Continued)

*Primary Examiner* — Jenny R Wu
(74) *Attorney, Agent, or Firm* — Oliff PLC (57) ABSTRACT

A method for refining hot metal in a converter using a top-blowing lance having a refining powder supply channel, a combustion oxidizing gas supply channel, and a refining oxidizing gas supply channel that are separate from each other includes supplying at least one of a lime-based flux, iron oxide, and a combustible material as a refining powder from the refining powder supply channel to a surface of the hot metal using a fuel gas or a mixture of the fuel gas and an inert gas as a carrier gas while supplying a combustion (Continued)

oxidizing gas from the combustion oxidizing gas supply channel to form a flame below a leading end of the top-blowing lance, and supplying a refining oxidizing gas from the refining oxidizing gas supply channel to the surface of the hot metal.

3 Claims, 3 Drawing Sheets

(51) Int. Cl.
| | | |
|---|---|---|
| *C21C 1/02* | (2006.01) | |
| *C21C 5/35* | (2006.01) | |
| *C21C 7/00* | (2006.01) | |
| *C21C 7/064* | (2006.01) | |
| *C21C 7/068* | (2006.01) | |
| *C21C 7/072* | (2006.01) | |

(52) U.S. Cl.
CPC .......... *C21C 5/4613* (2013.01); *C21C 7/0037* (2013.01); *C21C 7/064* (2013.01); *C21C 7/068* (2013.01); *C21C 7/072* (2013.01); *C21C 2250/00* (2013.01); *Y02P 10/212* (2015.11)

(58) Field of Classification Search
CPC ....... C21C 7/0037; C21C 7/064; C21C 7/068; C21C 7/072; Y02P 10/212
USPC .......................................................... 75/570
See application file for complete search history.

(56) References Cited

FOREIGN PATENT DOCUMENTS

| | | |
|---|---|---|
| JP | A-11-80825 | 3/1999 |
| JP | A-2001-323312 | 11/2001 |
| JP | A-2007-92158 | 4/2007 |
| JP | A-2010-156025 | 7/2010 |
| JP | A-2012-31452 | 2/2012 |

OTHER PUBLICATIONS

International Search Report issued in International Patent Application No. PCT/JP2013/001997 dated May 21, 2013.

Jul. 12, 2016 Office Action issued in Japanese Patent Application No. 2012-239975.

* cited by examiner

METHOD FOR REFINING HOT METAL IN CONVERTER

TECHNICAL FIELD

The present invention relates to methods for refining hot metal (also called molten iron) in a converter by blowing a refining oxidizing gas from a top-blowing lance onto the hot metal to dephosphorize or decarburize the hot metal. Specifically, the present invention relates to a method for refining hot metal while forming a flame at the leading end of a top-blowing lance to increase the temperature of the hot metal with the sensible heat of a powder heated by the flame or with the heat of combustion of a combustible material combusted by the flame so that the content of a cold iron source such as iron and steel scrap can be increased.

BACKGROUND ART

Recently, the reduction of $CO_2$ gas emissions has been an important issue in ironmaking processes for environmental protection, and attempts have been made to increase the content of cold iron sources (iron sources at ordinary temperature) used as iron sources in steelmaking processes. That is, attempts have been made to reduce the content of hot metal. In the manufacture of steel products, the manufacture of hot metal in a blast furnace involves the reduction and melting of iron ore, which requires considerable energy and produces enormous $CO_2$ emissions. In contrast, cold iron sources only require the heat of melting; therefore, the use of cold iron sources in steelmaking processes reduces the energy consumption by the heat of reduction of iron ore and also reduces $CO_2$ emissions. Examples of cold iron sources include iron and steel scrap, cold pig iron, and direct-reduced iron.

A molten-steel manufacturing process using a combination of a blast furnace and a converter, however, has a limited capacity for melting a cold iron source because the heat sources for melting the cold iron sources are the sensible heat of hot metal and the heat of combustion of carbon and silicon in the hot metal by oxidation. Recently, hot metal has also been dephosphorized as a pretreatment, which is disadvantageous for the melting of cold iron sources. An additional dephosphorization step decreases the temperature of the hot metal and also decreases the contents of carbon and silicon in the hot metal as they are oxidized during dephosphorization. Hot-metal dephosphorization is a refining step for removing phosphorus from hot metal in a steelmaking process while minimizing a decarburization reaction in advance before the hot metal is decarburized in a converter.

Accordingly, many solutions have been proposed to increase the thermal margin of hot metal during the dephosphorization or decarburization of the hot metal so that the content of cold iron sources can be increased. For example, Patent Literature 1 proposes a method in which hot metal is dephosphorized as a pretreatment while a carbon source is added to the resulting slag and is combusted by blowing an oxygen source into the slag to transfer the heat of combustion to the hot metal.

Patent Literature 2 proposes a method in which a heat transfer medium such as iron and steel scrap powder, ferroalloy powder, or quicklime powder is supplied together with oxygen gas from a top-blowing lance to hot metal in a refining vessel, for example, during the decarburization of the hot metal or the smelting reduction of iron or chromium. This method controls the secondary combustion rate in the refining vessel within the range of 10% to 55% to transfer the heat of secondary combustion to the heat transfer medium, thereby heating the hot metal with the heat transfer medium heated by the heat of secondary combustion.

Patent Literature 3 proposes a method for decarburizing hot metal in a converter using a top-blowing lance having a quintuple pipe structure having main holes serving as oxygen gas ejection holes and an auxiliary hole serving as a flux supply hole. The auxiliary hole is independent of the supply channel for the oxygen gas to be ejected from the main hole, and a fuel gas, oxygen gas, and a refining flux can be simultaneously ejected from the auxiliary hole. While jets of oxygen gas from the main holes are kept away from each other, a flame is formed at the leading end of the auxiliary hole independently of the jets of oxygen gas. The refining flux passes through the flame, which promotes the formation of slag from the refining flux.

CITATION LIST

Patent Literature

[PTL 1] Japanese Unexamined Patent Application Publication No. 9-20913
[PTL 2] Japanese Unexamined Patent Application Publication No. 2001-323312
[PTL 3] Japanese Unexamined Patent Application Publication No. 11-80825

SUMMARY OF INVENTION

Technical Problem

The above techniques in the related art, however, have the following problems.

Specifically, the technique of Patent Literature 1 has a problem in that the addition of a carbon source to the resulting slag, which increases the temperature of the hot metal, contaminates the hot metal with sulfur from the carbon source and thus increases the sulfur concentration of the hot metal. This technique also has a problem in that it requires sufficient time to combust the carbon source, which results in extended refining time, decreased productivity, and increased manufacturing costs. This technique also has a problem in that the combustion of the carbon source increases $CO_2$ gas emissions.

The technique of Patent Literature 2 requires the secondary combustion rate to be controlled depending on the supply rate of the heat transfer medium. As the means for implementing this control, Patent Literature 2 discloses a method for adjusting the height of the top-blowing lance while determining the secondary combustion rate based on the analysis of the composition of the exhaust gas. In general, a larger lance height increases the amount of converter atmospheric gas (mainly CO gas) accompanied by a jet of oxygen gas from the top-blowing lance and therefore increases the secondary combustion rate; a smaller lance height decreases the secondary combustion rate. Thus, increasing the secondary combustion rate as in the technique of Patent Literature 2 causes a problem in that it attenuates the jet of oxygen gas and thus decreases the decarburization rate, which results in extended decarburization time, decreased productivity, and increased manufacturing costs. The lance height is the distance between the leading end of a top-blowing lance and the surface of hot metal in a converter at rest.

The technique of Patent Literature 3 uses a top-blowing lance having a quintuple pipe structure having a channel for auxiliary-hole oxygen gas and a refining agent, a channel for a fuel gas, a channel for main-hole oxygen gas, a supply channel for cooling water, and a discharge channel for cooling water. The channel for the auxiliary hole-oxygen gas and the refining agent and the channel for the fuel gas meet at the leading end of the lance to form a combustion flame. The auxiliary-hole oxygen gas and the refining agent mix at the upper portion of the lance. An inert gas such as argon gas is used as a carrier gas for the refining agent before it mixes with the auxiliary-hole oxygen gas.

That is, in the technique of Patent Literature 3, the materials that pass through the channel for the auxiliary-hole oxygen gas and the refining agent are oxygen gas, the inert gas, and the refining agent. One problem with this technique is that both of the refining agent (such as iron oxide, iron ore, or steel mill dust), which contains metals and carbon, and oxygen gas pass through the same channel. Although the technique of Patent Literature 3 is effective in increasing the temperature of hot metal, the refining agent may heat up or combust in the channel in the lance as it causes sparks from friction on the channel wall (usually made of steel) or partially reacts with the oxygen gas during passage through the channel. Thus, this technique is disadvantageous in terms of equipment safety management.

In view of the foregoing background, an object of the present invention is to provide a method for refining hot metal in a converter by blowing a refining oxidizing gas onto the hot metal from a top-blowing lance to dephosphorize or decarburize the hot metal in the converter while forming a burner flame at the leading end of the top-blowing lance to transfer the heat of the flame to the hot metal in the converter, the method providing high heat transfer efficiency and productivity without the risk of heat-up or combustion in the channel in the top-blowing lance so that the content of a cold iron source such as iron and steel scrap can be increased.

Solution to Problem

The present invention, which is directed to solving the foregoing problems, is summarized as follows.

(1) A method for refining hot metal in a converter using a top-blowing lance having a refining powder supply channel, a combustion oxidizing gas supply channel, and a refining oxidizing gas supply channel that are separate from each other includes supplying at least one of a lime-based flux, iron oxide, and a combustible material from the refining powder supply channel to a surface of the hot metal in the converter using a fuel gas or a mixture of the fuel gas and an inert gas as a carrier gas while supplying a combustion oxidizing gas from the combustion oxidizing gas supply channel to form a flame with the combustion oxidizing gas and the fuel gas below a leading end of the top-blowing lance, and supplying a refining oxidizing gas from the refining oxidizing gas supply channel to the surface of the hot metal in the converter.

(2) The method for refining hot metal in a converter according to Item (1), wherein the volume fraction of the fuel gas in the carrier gas is 10% or more.

(3) The method for refining hot metal in a converter according to Item (1) or (2), wherein the flow rate of the combustion oxidizing gas supplied from the combustion oxidizing gas supply channel is adjusted depending on the supply rate of a combustible material supplied from the refining powder supply channel such that the combustible material is completely combusted.

Advantageous Effects of Invention

According to the present invention, at least one of a lime-based flux, iron oxide, and a combustible material is supplied as the refining powder from the top-blowing lance to the surface of the hot metal in the converter using a fuel gas or a mixture of the fuel gas and an inert gas as the carrier gas. This prevents heat-up or combustion of the refining powder in the channels of the top-blowing lance even if the refining powder added contains a metal or carbon.

Because the carrier gas contains a fuel gas, the refining powder passes through a flame formed below the leading end of the top-blowing lance by the combustion of the fuel gas, and the heat of the flame is efficiently transferred to the refining powder. Among the refining powders, a lime-based flux and iron oxide, which are noncombustible, are heated to high temperature. These refining powders transfer the heat of the flame to the hot metal. Among the refining powders, a combustible material is efficiently combusted to increase the flame temperature. The heat of the flame with increased temperature is transferred to the hot metal.

As a result, the hot metal has a larger thermal margin, which allows the content of a cold iron source such as iron and steel scrap to be increased in the dephosphorization or decarburization of hot metal in a converter.

DESCRIPTION OF EMBODIMENTS

The present invention will now be specifically described.

The present invention is directed to oxidation refining processes in which a refining oxidizing gas is supplied from a top-blowing lance to hot metal in a converter. Currently used oxidation refining processes include hot-metal dephosphorization and hot-metal decarburization. The present invention can be applied to either hot-metal dephosphorization or hot-metal decarburization. In this case, hot-metal decarburization may be performed using either hot metal dephosphorized as a pretreatment in advance or hot metal not dephosphorized. The present invention can also be applied to the dephosphorization of hot metal and then to the decarburization of the dephosphorized hot metal in a converter. Examples of refining oxidizing gases include oxygen gas (commercially pure oxygen), oxygen-enriched air, and a mixture of oxygen gas and a noble gas. Typically, oxygen gas is used.

The hot metal used in the present invention is hot metal manufactured in a blast furnace. The hot metal is transferred to a hot-metal transfer vessel, such as a hot metal ladle or a torpedo car, and is transported to a converter for dephosphorization or decarburization. If the present invention is applied to dephosphorization, it is preferred to remove silicon from the hot metal (referred to as "hot-metal desiliconization") in advance before dephosphorization to reduce the silicon content of the hot metal to 0.20% by mass or less, more preferably 0.10% by mass or less. This enables efficiently dephosphorizing hot metal using a smaller amount of lime-based flux. After desiliconization, the slag formed during desiliconization is discharged before dephosphorization. It should be understood that the present invention can also be applied to the dephosphorization of hot metal yet to be desiliconized.

The present invention will now be described using hot-metal dephosphorization as an example.

Although hot metal can be dephosphorized in a hot-metal transfer vessel such as a hot metal ladle or a torpedo car, it can be more vigorously stirred in a converter because it has a larger freeboard (the distance between the surface of the hot metal in the refining vessel and the top end of the refining vessel) than a hot-metal transfer vessel. The vigorously stirred hot metal not only has a larger capacity for melting a cold iron source, but can also be quickly dephosphorized using a smaller amount of lime-based flux. In the present invention, hot-metal dephosphorization is performed using a converter as a refining vessel.

Figure 1:
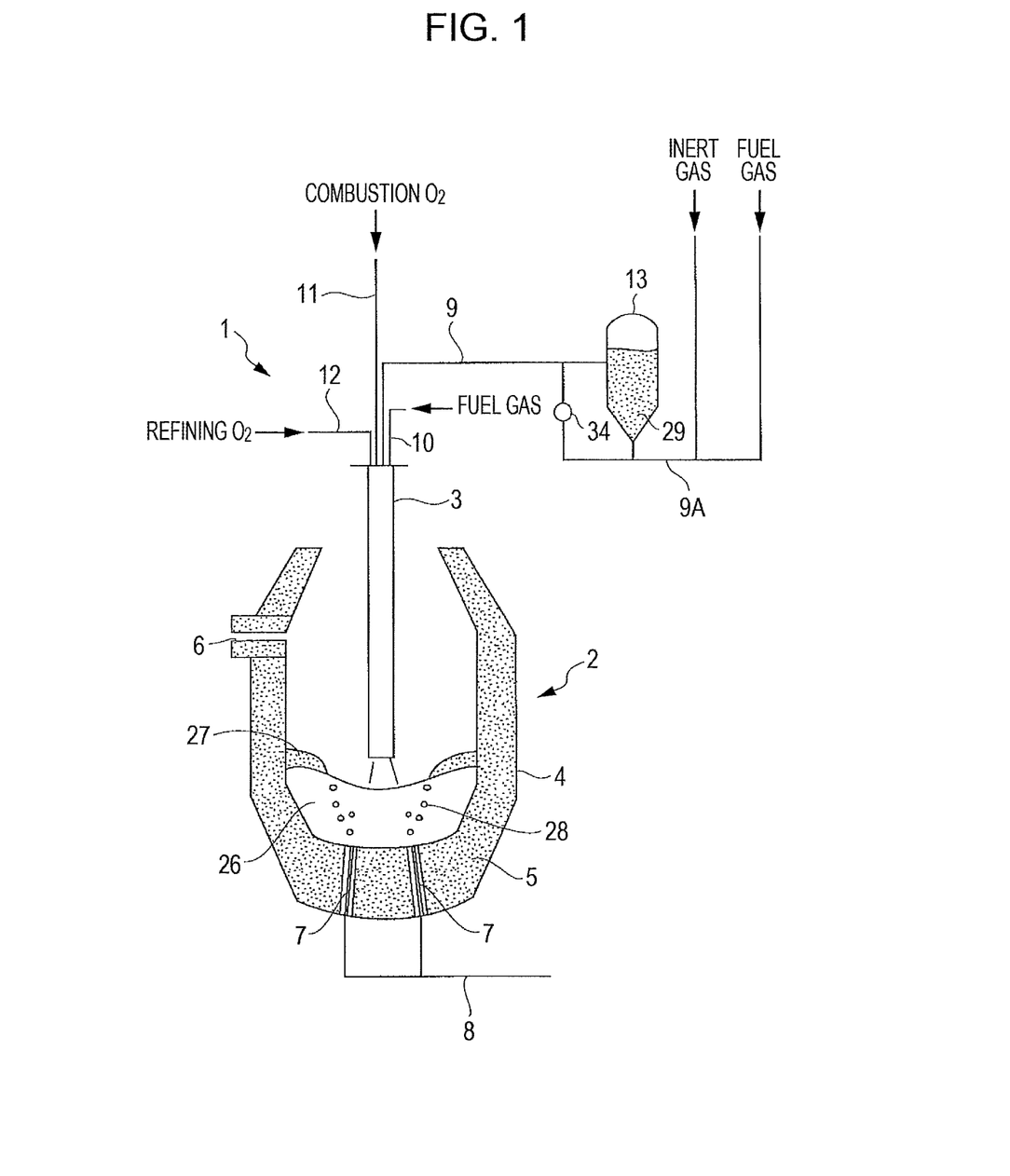
FIG. 1 is a schematic sectional view illustrating example converter equipment 1 used to practice the present invention.
Figure 2:
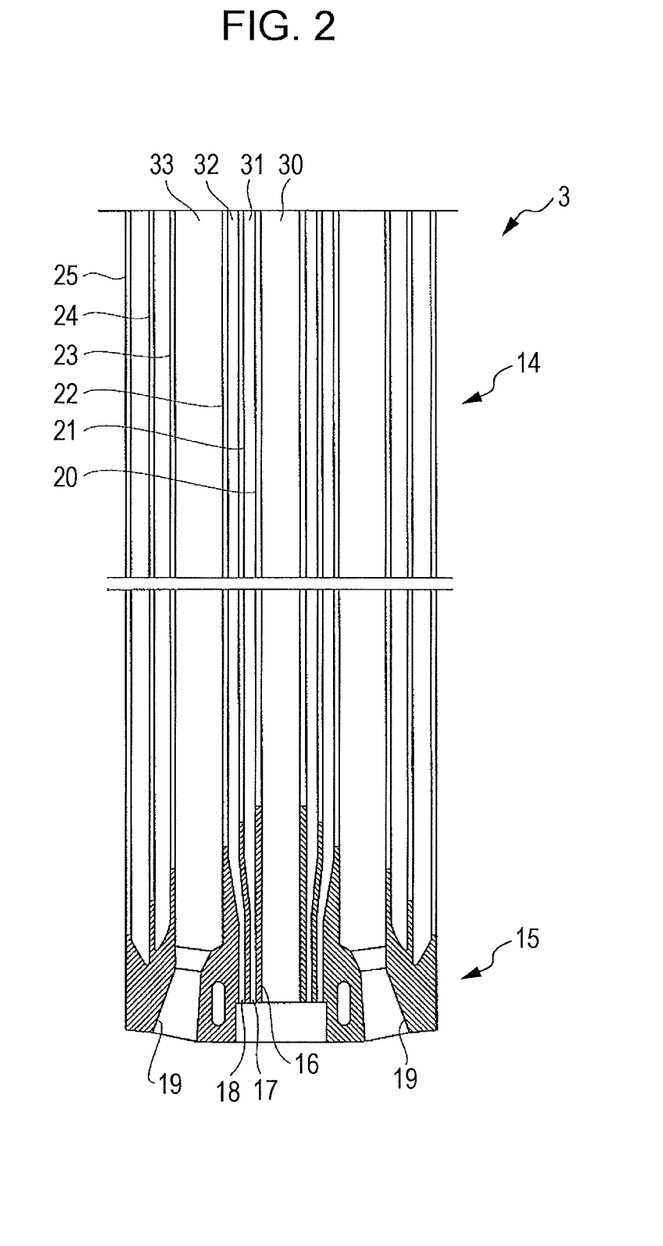
FIG. 2 is a schematic enlarged longitudinal sectional view of a top-blowing lance shown in FIG. 1.

FIG. 1 is a schematic sectional view illustrating example converter equipment 1 used to practice the present invention, and FIG. 2 is a schematic enlarged longitudinal sectional view of a top-blowing lance 3 shown in FIG. 1. In this embodiment, a top-blowing lance 3 having a sextuple pipe structure is illustrated as an example top-blowing lance.

As shown in FIG. 1, the converter equipment 1 used for dephosphorization according to the present invention includes a converter body 2 composed of a steel shell 4 and a refractory lining 5 inside the steel shell 4, and the top-blowing lance 3, which is inserted into the converter body 2 and which is movable vertically. A tap hole 6 from which hot metal 26 is tapped after dephosphorization is provided in the top of the converter body 2. A plurality of bottom-blowing tuyeres 7 from which a stirring gas 28 is ejected are provided in the bottom of the converter body 2. These bottom-blowing tuyeres 7 are connected to a gas inlet pipe 8.

The top-blowing lance 3 has connected thereto a refining powder supply pipe 9 through which a refining powder 29 is supplied together with a carrier gas, a fuel gas supply pipe 10 through which a fuel gas is supplied, a combustion oxidizing gas supply pipe 11 through which a combustion oxidizing gas for combusting the fuel gas is supplied, and a refining oxidizing gas supply pipe 12 through which a refining oxidizing gas is supplied. Also connected to the top-blowing lance 3 are a cooling water supply pipe (not shown) through which cooling water for cooling the top-blowing lance 3 is supplied and a cooling water discharged pipe (not shown) through which the cooling water is discharged.

The refining powder 29 is at least one of a lime-based flux, iron oxide, and a combustible material. The carrier gas for feeding the refining powder 29 is a fuel gas such as propane gas, liquefied natural gas, or coke oven gas, which is used alone or as a mixture with an inert gas such as nitrogen gas or argon gas. The fuel gas supplied through the fuel gas supply pipe 10 is, for example, propane gas, liquefied natural gas, or coke oven gas. The combustion oxidizing gas supplied through the combustion oxidizing gas supply pipe 11 to combust the fuel gas is, for example, oxygen gas, oxygen-enriched air, or air.

Although the fuel gas supply pipe 10 is connected to the top-blowing lance 3 in FIG. 1, the installation of the fuel gas supply pipe 10 is not essential for practicing the present invention. The installation of the fuel gas supply pipe 10' is not necessary if all the fuel gas required to form the target flame can be supplied as the carrier gas through the refining powder supply pipe 9. In the example illustrated in FIG. 1, the combustion oxidizing gas and the refining oxidizing gas are oxygen gas.

Although the fuel gas can be replaced with a hydrocarbon liquid fuel such as heavy fuel oil or kerosene, a fuel gas (gaseous fuel) is used as the fuel in the present invention because a liquid fuel might clog, for example, the nozzles at the outlets of the channels. The use of a gaseous fuel not only prevents nozzle clogging, but also facilitates supply rate control. Another advantage is that a flameout can be prevented, because a gaseous fuel ignites readily.

The other end of the refining powder supply pipe 9 is connected to a dispenser 13 containing the refining powder 29. The dispenser 13 is connected to a refining powder carrier gas supply pipe 9A. The refining powder carrier gas supply pipe 9A is supplied with the fuel gas alone or a mixture of the fuel gas and the inert gas. That is, the fuel gas or the mixture of the fuel gas and the inert gas supplied through the refining powder carrier gas supply pipe 9A to the dispenser 13 functions as the carrier gas for the refining powder 29 contained in the dispenser 13. The refining powder 29 contained in the dispenser 13 can be supplied through the refining powder supply pipe 9 to the top-blowing lance 3 and is blown from the leading end of the top-blowing lance 3 onto the hot metal 26.

The flow rates of the fuel gas and the inert gas supplied to the refining powder carrier gas supply pipe 9A can each be controlled with a flow control valve (not shown). In the present invention, the carrier gas for the refining powder 29 is the fuel gas alone or a mixture of the fuel gas and the inert gas, and not the inert gas alone. The refining powder carrier gas supply pipe 9A is directly connected to the refining powder supply pipe 9 and has a shutoff valve 34 that can be opened and closed to directly supply the fuel gas or the inert gas to the top-blowing lance 3 without feeding the refining powder 29. The shutoff valve 34 is closed when the refining powder 29 is fed.

The top-blowing lance 3, having a sextuple pipe structure, illustrated in FIG. 2 as an example top-blowing lance used in the present invention includes a cylindrical lance body 14 and a lance tip 15 made of a copper casting and connected to the bottom end of the lance body 14, for example, by welding. The lance body 14 is composed of six concentric steel pipes, i.e., a sextuple pipe, including an innermost pipe 20, a partition pipe 21, an inner pipe 22, a middle pipe 23, an outer pipe 24, and an outermost pipe 25. The refining powder supply pipe 9 communicates with the innermost pipe 20. The fuel gas supply pipe 10 communicates with the partition pipe 21. The combustion oxidizing gas supply pipe 11 communicates with the inner pipe 22. The refining oxidizing gas supply pipe 12 communicates with the middle pipe 23. The cooling water supply pipe and the cooling water discharge pipe communicate with either the outer pipe 24 or the outermost pipe 25. That is, the refining powder 29 passes through the innermost pipe 20 together with the carrier gas. The fuel gas, such as propane gas, passes through the space between the innermost pipe 20 and the partition pipe 21. The combustion oxidizing gas passes through the space between the partition pipe 21 and the inner pipe 22. The refining oxidizing gas passes through the space between the inner pipe 22 and the middle pipe 23. The space between the middle pipe 23 and the outer pipe 24 and the space between the outer pipe 24 and the outermost pipe 25 form either the cooling water supply channel or the cooling water discharge channel. One of the space between the middle pipe 23 and the outer pipe 24 and the space between the outer pipe 24 and the outermost pipe 25 forms the supply channel, and the other forms the discharge channel, although either space may be chosen as the supply channel. The cooling water turns around at the lance tip 15.

The interior of the innermost pipe 20 communicates with a central hole 16 located substantially at the axis of the lance tip 15. The space between the innermost pipe 20 and the partition pipe 21 communicates with a fuel gas ejection hole 17 provided as an annular nozzle or a plurality of concentric nozzle holes around the central hole 16. The space between the partition pipe 21 and the inner pipe 22 communicates with a combustion oxidizing gas ejection hole 18 provided as an annular nozzle or a plurality of concentric nozzle holes around the fuel gas ejection hole 17. The space between the inner pipe 22 and the middle pipe 23 communicates with a plurality of peripheral holes 19 provided around the combustion oxidizing gas ejection hole 18. The central hole 16 is a nozzle from which the refining powder 29 is blown together with the carrier gas. The fuel gas ejection hole 17 is a nozzle from which the fuel gas is ejected. The combustion oxidizing gas ejection hole 18 is a nozzle from which the combustion oxidizing gas for combusting the fuel gas is ejected. The peripheral holes 19 are nozzles from which the refining oxidizing gas is blown.

That is, the interior of the innermost pipe 20 forms a refining powder supply channel 30. The space between the innermost pipe 20 and the partition pipe 21 forms a fuel gas supply channel 31. The space between the partition pipe 21 and the inner pipe 22 forms a combustion oxidizing gas supply channel 32. The space between the inner pipe 22 and the middle pipe 23 forms a refining oxidizing gas supply channel 33. In FIG. 2, the central hole 16 is a straight nozzle, whereas the peripheral holes 19 have the shape of a Laval nozzle, which is composed of two cones forming a converging portion and a diverging portion in cross-section. The central hole 16 may also have the shape of a Laval nozzle. The fuel gas ejection hole 17 and the combustion oxidizing gas ejection hole 18 are straight nozzles provided as annular slits or straight nozzles having a circular cross-section. The portion of a Laval nozzle that has the smallest cross-sectional area between the two cones forming the converging portion and the diverging portion is referred to as "throat".

The thus-configured converter equipment 1 is used to perform the dephosphorization of the hot metal 26 according to the present invention, which is intended to increase the cold iron source content, as follows.

A cold iron source is first charged into the converter body 2. Examples of cold iron sources include iron and steel scrap such as cropping scrap from slabs and steel sheets produced in steel mills and commercial scrap, metal recovered from slag by magnetic separation, cold pig iron, and direct-reduced iron. The cold iron source content is preferably 5% by mass or more of all iron sources charged. The cold iron source content is defined by equation (1):

$$\text{Cold iron source content (\% by mass)} = \text{amount of cold iron source} \times 100/(\text{amount of hot metal} + \text{amount of cold iron source}) \quad (1)$$

A cold iron source content of 5% by mass or more is effective in increasing the productivity and reducing $CO_2$ gas emissions. The upper limit of the cold iron source content need not be set, but it may be added in any amount provided that the temperature of the hot metal can be maintained within the target range after dephosphorization.

The blowing of the stirring gas 28 from the bottom-blowing tuyeres 7 is started before or after the cold iron source is completely charged.

After the cold iron source is charged into the converter body 2, the hot metal 26 is charged into the converter body 2. A hot metal 26 of any composition may be dephosphorized and may be desulfurized or desiliconized before dephosphorization. The major chemical constituents of the hot metal 26 before dephosphorization are about 3.8% to 5.0% by mass carbon, about 0.5% by mass or less silicon, about 0.08% to 0.2% by mass phosphorus, and about 0.05% by mass or less sulfur. The formation of a larger amount of slag 27 in the converter body during dephosphorization decreases the dephosphorization efficiency. To reduce the amount of slag formed in the converter and thereby increase the dephosphorization efficiency, as described above, the hot metal is preferably desiliconized in advance to a silicon concentration of 0.20% by mass or less, more preferably 0.10% by mass or less. The hot metal can be successfully dephosphorized at 1,200° C. to 1,450° C.

Then, the fuel gas alone or a mixture of the fuel gas and the inert gas is then supplied to the dispenser 13 as the carrier gas to blow the refining powder 29, which is at least one of a lime-based flux, iron oxide, and a combustible material, from the central hole 16 of the top-blowing lance 3 onto the surface of the hot metal 26 together with the carrier gas. Before, during, or after the blowing of the refining powder 29, a flame is formed below the top-blowing lance 3 by ejecting the fuel gas from the fuel gas ejection hole 17 and ejecting the combustion oxidizing gas from the combustion oxidizing gas ejection hole 18. If the carrier gas is a mixture of the fuel gas and the inert gas, the volume fraction of the fuel gas in the mixture is preferably 10% or more to efficiently transfer the heat of combustion of the fuel gas to the refining powder 29.

To form a flame at the leading end of the top-blowing lance 3, the flow rates of the fuel gas and the combustion oxidizing gas supplied to the top-blowing lance 3 are adjusted such that the fuel gas is completely combusted with the combustion oxidizing gas. The flow rates of the fuel gas and the combustion oxidizing gas are controlled such that the fuel gas is completely combusted inside the converter body 2.

The fuel gas supplied from the central hole 16 and the fuel gas ejection hole 17 is adjacent to the combustion oxidizing gas supplied from the combustion oxidizing gas ejection hole 18 in all radial directions of the top-blowing lance 3. Thus, the fuel gas interferes with the combustion oxidizing gas and combusts when the gas concentration reaches the range within the combustion limit even without an ignition device because of the high atmospheric temperature, thus forming a flame below the top-blowing lance 3.

Among the refining powders 29 ejected from the central hole 16 together with the carrier gas, a lime-based flux and iron oxide, which are noncombustible, are heated or heated and melted by the heat of the resulting flame and are blown onto the surface of the hot metal 26 in a heated or melted state. Accordingly, the heat of the heated refining powder 29 is transferred to the hot metal 26 to increase the temperature of the hot metal 26, thus promoting melting of the cold iron source added. Among the refining powders 29 ejected from the central hole 16 together with the carrier gas, a combustible material is combusted by the flame. In addition to the heat of combustion of the fuel gas, the heat of combustion of the combustible material contributes to the heating of the hot metal 26 to increase the temperature of the hot metal 26, thus promoting melting of the cold iron source added.

At the same time, the refining oxidizing gas is blown from the peripheral holes 19 of the top-blowing lance 3 onto the surface of the hot metal 26.

The dephosphorization reaction of the hot metal 26 proceeds such that the phosphorus in the hot metal 26 reacts with the oxidizing gas or iron oxide to form phosphorus oxide ($P_2O_5$), and the phosphorus oxide is absorbed into the slag 27 formed from the lime-based flux in the form of $3CaO \cdot P_2O_5$. In addition, the dephosphorization rate increases as the formation of slag from the lime-based flux is promoted. Thus, preferably a lime-based flux such as quicklime (CaO), limestone ($CaCO_3$), or hydrated lime ($Ca(OH)_2$) is used as the refining powder 29. The lime-based flux may be a mixture of quicklime with fluorite ($CaF_2$) or alumina ($Al_2O_3$), which serves as a slag formation accelerator. Converter slag ($CaO$—$SiO_2$-based slag) formed during the decarburization of the hot metal 26 may be used as part or all of the lime-based flux.

The lime-based flux blown onto the surface of the hot metal 26 as the refining powder 29 immediately forms the slag 27. The phosphorus in the hot metal reacts with the supplied refining oxidizing gas to form phosphorus oxide. As the hot metal 26 and the slag 27 are vigorously stirred by the stirring gas 28, the resulting phosphorus oxide is quickly absorbed into the slag 27 to facilitate the decarburization reaction of the hot metal 26. If the refining powder 29 is not a lime-based flux, a lime-based flux is separately charged onto the hot metal from an overhead hopper.

If an iron oxide such as iron ore, sintered iron ore powder, mill scale, or steel mill dust is used as the refining powder 29, the iron oxide functions as an oxygen source. A dephosphorization reaction proceeds as the iron oxide reacts with the phosphorus in the hot metal. The iron oxide also reacts with the lime-based flux to form FeO—CaO on the surface of the lime-based flux. This promotes the formation of slag from the lime-based flux and thus promotes the dephosphorization reaction. If the iron oxide is one containing a combustible material, such as steelmaking dust (also referred to as "converter dust") or blast furnace dust, the combustible material is combusted by the flame. In addition to the heat of combustion described above, the heat of combustion of the combustible material contributes to the heating of the hot metal 26.

If a combustible material such as aluminum ash (aluminum oxide, containing 30% to 50% by mass metallic aluminum, that is formed by a reaction between aluminum and oxygen in air during the melting of an aluminum ingot or scrap in a melting furnace), coke, or coal is used as the refining powder 29, the combustible material is combusted by the flame. In addition to the heat of combustion of the fuel gas, the heat of combustion of the combustible material contributes to the heating of the hot metal 26. Because the ash remaining after the combustion of the combustible material is hot, the hot metal 26 is also heated as the ash is supplied to the hot metal 26.

If the refining powder 29 is a mixture of a lime-based flux, iron oxide, and a combustible material, their respective effects can be simultaneously achieved.

The heat of the heated or heated and melted refining powder 29 is transferred to the hot metal 26. In addition, the heat of combustion of the flame at the leading end of the top-blowing lance above the hot metal 26 is transferred to the hot metal 26. As the hot metal 26 is vigorously stirred, the melting of the cold iron source in the hot metal 26 is promoted. Thus, the melting of the charged cold iron source is completed during dephosphorization.

After the phosphorus concentration of the hot metal 26 is decreased to or below the target level, all supplies from the top-blowing lance 3 to the hot metal 26 are interrupted to terminate dephosphorization. After dephosphorization, the converter body 2 is tilted to tap the dephosphorized hot metal 26 from the tap hole 6 into a hot metal vessel such as a ladle or a converter charging ladle, and the tapped hot metal 26 is subjected to the next step.

As described above, according to the present invention, at least one of a lime-based flux, iron oxide, and a combustible material is supplied as the refining powder 29 from the top-blowing lance 3 to the surface of the hot metal in the converter using a fuel gas alone or a mixture of the fuel gas and an inert gas as the carrier gas. This prevents heat-up or combustion of the refining powder 29 in the channels of the top-blowing lance 3 even if the refining powder 29 added contains a metal or carbon.

Because the carrier gas contains a fuel gas, the refining powder 29 passes through a flame formed below the leading end of the top-blowing lance 3 by the fuel gas, and the heat of the flame is efficiently transferred to the refining powder 29. Among the refining powders 29, a lime-based flux and iron oxide, which are noncombustible, are heated to high temperature. These refining powders transfer the heat of the flame to the hot metal 26. Among the refining powders 29, a combustible material is efficiently combusted to increase the flame temperature. The heat of the flame with increased temperature is transferred to the hot metal 26. As a result, the hot metal 26 has a larger thermal margin, which allows the content of a cold iron source such as iron and steel scrap to be significantly increased in the dephosphorization or decarburization of hot metal in a converter.

Although the dephosphorization of hot metal in a converter has been described above as an example, the present invention can also be applied to the decarburization of hot metal in a converter using the oxidation refining process described above. Although the top-blowing lance, having a sextuple pipe structure, illustrated in FIG. 2 has been described as an example top-blowing lance used in the present invention, the fuel gas need not be supplied from the fuel gas ejection hole 17 in the present invention if all the fuel gas can be supplied from the central hole 16. In this case, the present invention can be applied to a top-blowing lance having a quintuple pipe structure without the fuel gas ejection hole 17 and the partition pipe 21. This simplifies the structure of the top-blowing lance and thus reduces the equipment cost thereof.

EXAMPLE 1

Small converter equipment with a capacity of 2.5 tons having the same structure as the converter equipment shown in FIG. 1 was used to examine the flame temperature with varying contents, i.e., volume fractions, of a fuel gas (propane gas) and an inert gas (nitrogen gas) in a carrier gas for feeding a refining powder. The top-blowing lance used in this small converter equipment had a sextuple pipe structure, as does the top-blowing lance shown in FIG. 2. The sextuple pipe structure was composed of, in order from the center in a transverse cross-section, a refining powder supply channel, a fuel gas supply channel, a combustion oxidizing gas supply channel, a refining oxidizing gas supply channel, a cooling water supply channel, and a cooling water discharge channel.

A refining powder was supplied from a circular straight central hole in the center of the lance. A fuel gas was supplied from an annular (ring-shaped) fuel gas ejection hole. Combustion oxygen gas for combusting the fuel gas was supplied from an annular (ring-shaped) combustion oxidizing gas ejection hole. Refining oxygen gas was supplied from three concentric peripheral holes having the shape of a Laval nozzle to the converter. The central hole had an inner diameter of 11.5 mm. The fuel gas ejection hole had an annular slit width of 1.0 mm. The combustion oxidizing gas ejection hole had an annular slit width of 1.85 mm. The peripheral holes were Laval nozzles having a throat diameter of 7 mm and had an ejection angle of 15° with respect to the central axis of the lance.

The total flow rate of the propane gas supplied to the refining powder supply channel and the fuel gas supply channel was 0.40 $Nm^3$/min, and part or all of the propane gas was supplied as the carrier gas to the refining powder supply channel. The flow rate of the nitrogen gas supplied as the carrier gas to the refining powder supply channel was varied within the range of 0 to 0.40 $Nm^3$/min depending on the flow rate of the propane gas, and the total flow rate of the carrier gas was 0.40 $Nm^3$/min. The flow rate of the combustion oxygen gas supplied to the combustion oxidizing gas supply channel was 2.0 $Nm^3$/min, which is the chemically equivalent amount required to completely combust the propane gas supplied. The flow rate of the refining oxygen gas supplied to the refining oxidizing gas supply channel was 5.0 $Nm^3$/min. No refining powder was used, and the test was performed without charging hot metal into the small converter.

Figure 3:
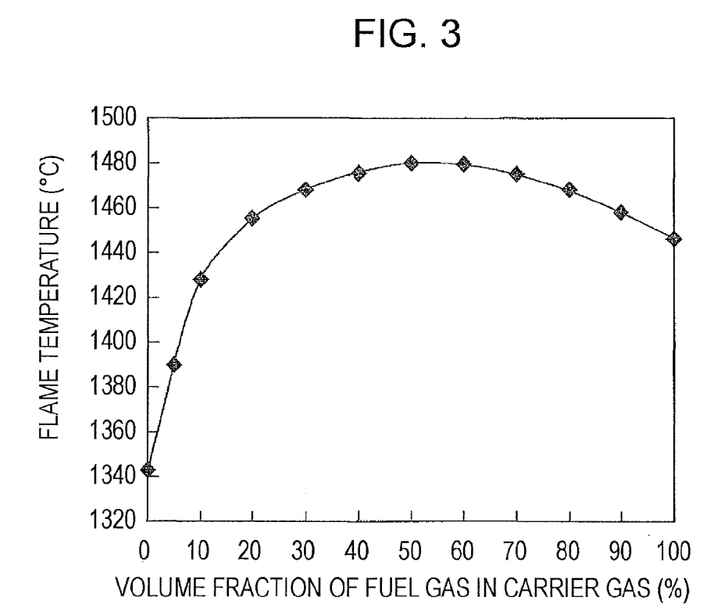
FIG. 3 is a graph showing the flame temperature measured with varying volume fractions of a fuel gas in a carrier gas.

The fuel gas, the combustion oxygen gas, and the refining oxygen gas were ejected from the top-blowing lance. After a flame was stably formed, the temperature of the flame at a position 600 mm away from the leading end of the lance vertically downward was measured with a thermocouple. FIG. 3 shows the flame temperature measured with varying volume fractions of the fuel gas in the carrier gas.

As shown in FIG. 3, the flame temperature varied with the volume fraction of the fuel gas in the carrier gas. Specifically, the flame temperature reached when the volume fraction of the fuel gas in the carrier gas was 10% or more was at least about 90° C. higher than that reached when nitrogen gas (inert gas) was used alone as the carrier gas. This demonstrates that the volume fraction of the fuel gas in the carrier gas is preferably 10% or more. In addition, the flame temperature was highest when the volume fraction of the fuel gas in the carrier gas was about 50%. This demonstrates that the volume fraction of the fuel gas in the carrier gas is preferably maintained within the range of 30% to 80%, more preferably 40% to 60%, to achieve high flame temperature.

In view of the above results, hot metal was dephosphorized using the above small converter equipment (Invention Examples 1 to 6). The top-blowing lance used was the above top-blowing lance used to measure the flame temperature.

In Invention Examples 1 to 6, iron and steel scrap was charged into the converter, and hot metal at 1,350° C. was then charged into the converter. The hot metal was then dephosphorized by blowing quicklime (refining powder), a fuel gas (propane gas), combustion oxygen gas, and refining oxygen gas from the top-blowing lance onto the hot metal while blowing argon gas as a stirring gas from the bottom-blowing tuyeres into the hot metal. During this process, the total flow rate of the propane gas supplied to the refining powder supply channel and the fuel gas supply channel was 0.40 $Nm^3$/min, and part or all of the propane gas was supplied as the carrier gas to the refining powder supply channel. The total flow rate of the propane gas and the nitrogen gas supplied as the carrier gas was 0.40 $Nm^3$/min. The volume fraction of the propane gas in the carrier gas was adjusted to 5% (Invention Example 1), 10% (Invention Example 2), 25% (Invention Example 3), 50% (Invention Example 4), 75% (Invention Example 5), or 100% (Invention Example 6). The amount of iron and steel scrap charged was adjusted such that the temperature of the hot metal after dephosphorization was 1,400° C. That is, more iron and steel scrap was charged when the hot metal had a larger thermal margin. The amount of quicklime added was adjusted such that the basicity of the slag in the converter after dephosphorization (mass percent CaO/mass percent $SiO_2$) was 2.5.

For comparison, a test (Comparative Example 1) was also performed in which hot metal was dephosphorized by supplying propane gas only from the fuel gas supply channel while supplying nitrogen gas alone as the carrier gas.

Table 1 shows the composition of the hot metal used in Invention Examples 1 to 6 and Comparative Example 1. Table 2 shows the operating conditions of Invention Examples 1 to 6 and Comparative Example 1.

TABLE 1

| Temperature (° C.) and chemical composition (% by mass) of hot metal | | | | | | |
|---|---|---|---|---|---|---|
| Temperature | C | Si | Mn | P | S | Cr |
| 1350 | 4.4 | 0.20 | 0.21 | 0.12 | 0.011 | tr |

TABLE 2

| | Top blowing | | | | | | | |
|---|---|---|---|---|---|---|---|---|
| | Refining powder Quicklime kg/min | Carrier gas | | Propane gas from fuel gas supply channel $Nm^3$/min | Combustion oxygen gas $Nm^3$/min | Refining oxygen gas $Nm^3$/min | Lance height m | Bottom blowing Ar gas $Nm^3$/min |
| | | $N_2$ gas $Nm^3$/min | Propane gas $Nm^3$/min | | | | | |
| Invention Example 1 | 3.0 | 0.38 | 0.02 | 0.38 | 2.0 | 5.0 | 0.6 | 0.25 |
| Invention Example 2 | 3.0 | 0.36 | 0.04 | 0.36 | 2.0 | 5.0 | 0.6 | 0.25 |
| Invention Example 3 | 3.0 | 0.30 | 0.10 | 0.30 | 2.0 | 5.0 | 0.6 | 0.25 |
| Invention Example 4 | 3.0 | 0.20 | 0.20 | 0.20 | 2.0 | 5.0 | 0.6 | 0.25 |

TABLE 2-continued

| | Top blowing | | | | | | | Bottom |
|---|---|---|---|---|---|---|---|---|
| | Refining | Carrier gas | | Propane gas from fuel gas | | Refining | | |
| | powder Quicklime kg/min | $N_2$ gas $Nm^3/min$ | Propane gas $Nm^3/min$ | supply channel $Nm^3/min$ | Combustion oxygen gas $Nm^3/min$ | oxygen gas $Nm^3/min$ | Lance height m | blowing Ar gas $Nm^3/min$ |
| Invention Example 5 | 3.0 | 0.10 | 0.30 | 0.10 | 2.0 | 5.0 | 0.6 | 0.25 |
| Invention Example 6 | 3.0 | 0 | 0.40 | 0 | 2.0 | 5.0 | 0.6 | 0.25 |
| Comparative Example 1 | 3.0 | 0.40 | 0 | 0.40 | 2.0 | 5.0 | 0.6 | 0.25 |

Figure 4:
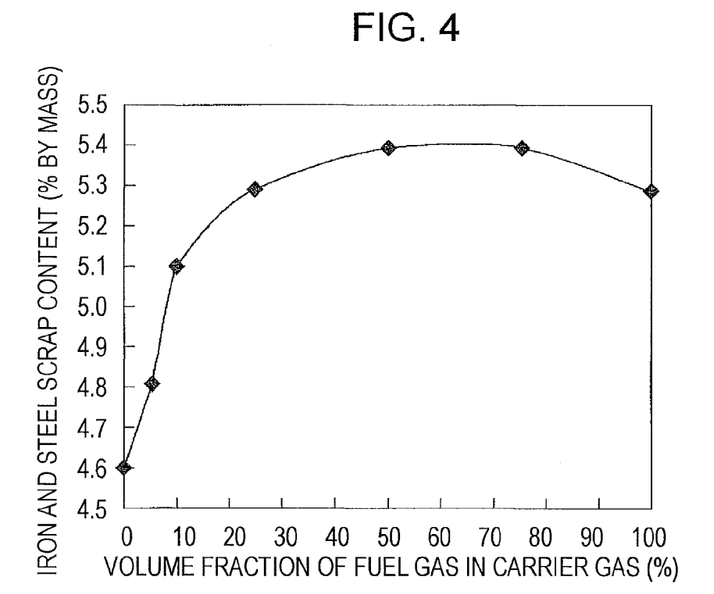
FIG. 4 is a graph showing the relationship between the content of the fuel gas in the carrier gas and the iron and steel scrap content.

Table 3 shows the refining time and the iron and steel scrap content of Invention Examples 1 to 6 and Comparative Example 1. FIG. 4 shows the relationship between the content of the fuel gas (propane gas) in the carrier gas and the iron and steel scrap content for Invention Examples 1 to 6 and Comparative Example 1.

TABLE 3

| | Refining time (min) | Iron and steel scrap content (% by mass) |
|---|---|---|
| Invention Example 1 | 8.0 | 4.8 |
| Invention Example 2 | 8.0 | 5.1 |
| Invention Example 3 | 8.0 | 5.3 |
| Invention Example 4 | 8.0 | 5.4 |
| Invention Example 5 | 8.0 | 5.4 |
| Invention Example 6 | 8.0 | 5.3 |
| Comparative Example 1 | 8.0 | 4.6 |

As shown in Table 3 and FIG. 4, a comparison between the iron and steel scrap contents of Invention Examples 1 to 6 and Comparative Example 1 demonstrates that the iron and steel scrap content can be increased by applying the present invention if hot metal is dephosphorized for the same period of time. The results also demonstrate that an iron and steel scrap content of 5% by mass or more can be achieved if the volume fraction of the fuel gas (propane gas) in the carrier gas is 10% or more. In addition, the relationship between the iron and steel scrap content and the volume fraction of the fuel gas in the carrier gas in FIG. 4 was similar to the relationship between the flame temperature and the volume fraction of the fuel gas in the carrier gas in FIG. 3.

EXAMPLE 2

The same small converter equipment as in Example 1 was used to dephosphorize hot metal by supplying a mixture of quicklime (lime-based flux) and steelmaking dust (iron oxide) containing combustible materials as the refining powder (Invention Examples 7 and 8).

In Invention Example 7, the total flow rate of the propane gas supplied to the refining powder supply channel and the fuel gas supply channel was 0.40 $Nm^3$/min, and the flow rate of the propane gas supplied as the carrier gas to the refining powder supply channel was 0.20 $Nm^3$/min. The flow rate of the carrier gas was 0.40 $Nm^3$/min, which is the sum of the flow rate of the propane gas, i.e., 0.20 $Nm^3$/min, and the flow rate of the nitrogen gas, i.e., 0.20 $Nm^3$/min. The flow rate of the combustion oxygen gas supplied to the combustion oxidizing gas supply channel was set such that the propane gas and the combustible materials in the steelmaking dust were completely combusted (=2.2 $Nm^3$/min). The amount of iron and steel scrap charged was adjusted such that the temperature of the hot metal after dephosphorization was 1,400° C. The amount of quicklime added was adjusted such that the basicity of the slag in the converter after dephosphorization (mass percent CaO/mass percent $SiO_2$) was 2.5.

Invention Example 8 was performed under the same conditions as Invention Example 7 except that the flow rate of the combustion oxygen gas supplied to the combustion oxidizing gas supply channel was set such that the propane gas was completely combusted, without taking into account the combustion of the combustible materials in the steelmaking dust (=2.0 $Nm^3$/min).

Table 4 shows the composition of the steelmaking dust used as the refining powder in Invention Examples 7 and 8. Table 5 shows the operating conditions of Invention Examples 7 and 8. In Table 4, T. Fe denotes the total content of iron contained as metallic iron and iron oxides (such as FeO and $Fe_2O_3$) in the steelmaking dust. The combustible materials in the steelmaking dust include metallic iron and carbon.

TABLE 4

| Chemical composition of steelmaking dust (% by mass) | | | | | | |
|---|---|---|---|---|---|---|
| T. Fe | Metallic Fe | C | CaO | $SiO_2$ | $Al_2O_3$ | MgO |
| 77.0 | 61.4 | 1.1 | 4.9 | 1.9 | 0.3 | 2.0 |

TABLE 5

| | Refining powder | | Carrier gas | | Propane gas from fuel gas | | Refining | | Bottom |
|---|---|---|---|---|---|---|---|---|---|
| | Quicklime kg/min | Steelmaking dust kg/min | N$_2$ gas Nm$^3$/min | Propane gas Nm$^3$/min | supply channel Nm$^3$/min | Combustion oxygen gas Nm$^3$/min | oxygen gas Nm$^3$/min | Lance height m | blowing Ar gas Nm$^3$/min |
| | | | | | Top blowing | | | | |
| Invention Example 7 | 3.0 | 1.5 | 0.20 | 0.20 | 0.20 | 2.2 | 5.0 | 0.6 | 0.25 |
| Invention Example 8 | 3.0 | 1.5 | 0.20 | 0.20 | 0.20 | 2.0 | 5.0 | 0.6 | 0.25 |

Table 6 shows the refining time and the iron and steel scrap content of Invention Examples 7 and 8.

TABLE 6

| | Refining time (min) | Iron and steel scrap content (% by mass) |
|---|---|---|
| Invention Example 7 | 8.0 | 6.6 |
| Invention Example 8 | 8.0 | 5.7 |

As can be seen from Table 6, the iron and steel scrap contents of Invention Examples 7 and 8 were higher than those of Invention Examples 1 to 6. This is because steelmaking dust containing combustible materials was used as the refining powder, and the use of quicklime and steelmaking dust as the refining powder increased the amount of refining powder heated. In particular, Invention Example 7, in which the flow rate of the combustion oxygen gas was set taking into account the combustion of the combustible materials in the steelmaking dust, achieved a high iron and steel scrap content, i.e., 6.6% by mass.

REFERENCE SIGNS LIST 1 converter equipment
2 converter body
3 top-blowing lance
4 steel shell
5 refractory lining
6 tap hole
7 bottom-blowing tuyere
8 gas inlet pipe
9 refining powder supply pipe
10 fuel gas supply pipe
11 combustion oxidizing gas supply pipe
12 refining oxidizing gas supply pipe
13 dispenser
14 lance body
15 lance tip
16 central hole
17 fuel gas ejection hole
18 combustion oxidizing gas ejection hole
19 peripheral hole
20 innermost pipe
21 partition pipe
22 inner pipe
23 middle pipe
24 outer pipe
25 outermost pipe
26 hot metal (molten iron)
27 slag
28 stirring gas
29 refining powder
30 refining powder supply channel
31 fuel gas supply channel
32 combustion oxidizing gas supply channel
33 refining oxidizing gas supply channel
34 shutoff valve

The invention claimed is:

1. A method for refining hot metal in a converter using a top-blowing lance having a refining powder supply channel, a combustion oxidizing gas supply channel, and a refining oxidizing gas supply channel that are separate from each other, the method comprising:
supplying a refining powder from the refining powder supply channel to a surface of the hot metal in the converter using a carrier gas,
the refining powder including at least one of a lime-based flux, iron oxide, and a combustible material, and
the carrier gas including a fuel gas or a mixture of the fuel gas and an inert gas, and the volume fraction of the fuel gas in the carrier gas is 30% or more and 80% or less,
while supplying the refining powder, supplying a combustion oxidizing gas from the combustion oxidizing gas supply channel to form a flame with the combustion oxidizing gas and the fuel gas below a leading end of the top-blowing lance, and
supplying a refining oxidizing gas from the refining oxidizing gas supply channel to the surface of the hot metal in the converter.

2. The method for refining hot metal in a converter according to claim 1, wherein:
the refining powder is the combustible material, and
the flow rate of the combustion oxidizing gas supplied from the combustion oxidizing gas supply channel is adjusted depending on the supply rate of the combustible material supplied from the refining powder supply channel such that the combustible material is completely combusted.

3. The method for refining hot metal in a converter according to claim 1, wherein only the mixture of the fuel gas and the inert gas is used as the carrier gas.

* * * * *